Dec. 10, 1968    R. HÖRNLEIN ET AL    3,415,388
DEVICE FOR TRANSFERRING PREFORMED FOILS
FROM STACKS INTO MOULDS
Filed Oct. 19, 1965    4 Sheets-Sheet 1
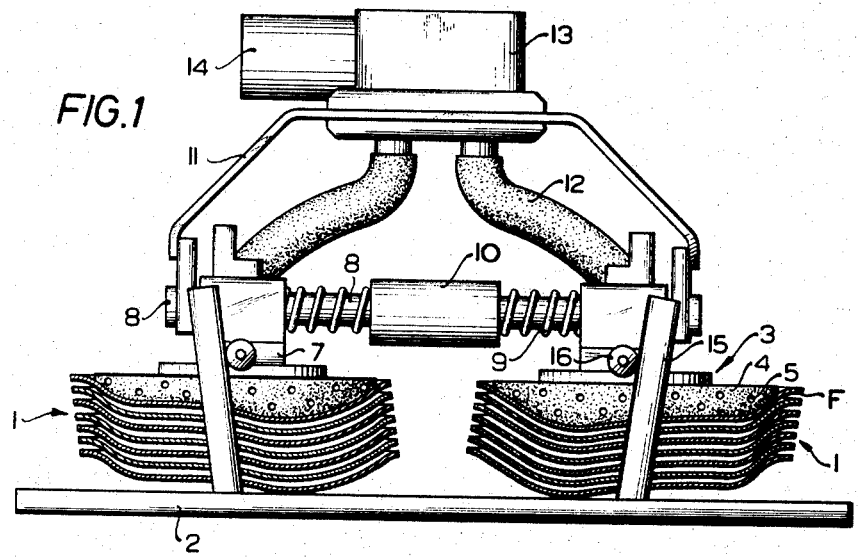
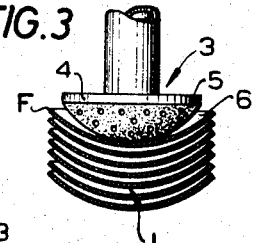
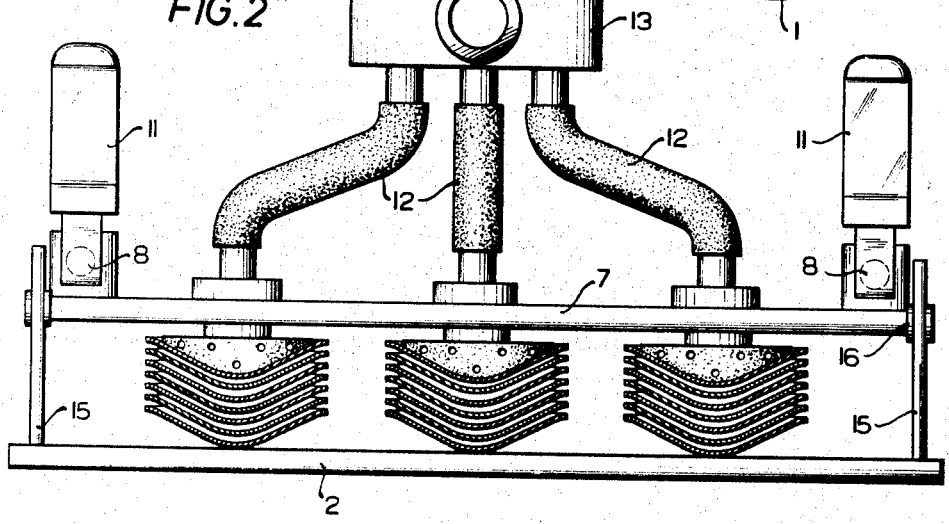
INVENTORS
ROLAND HÖRNLEIN
GEROLD DOMHAN
BY Dicke + Craig
ATTORNEYS

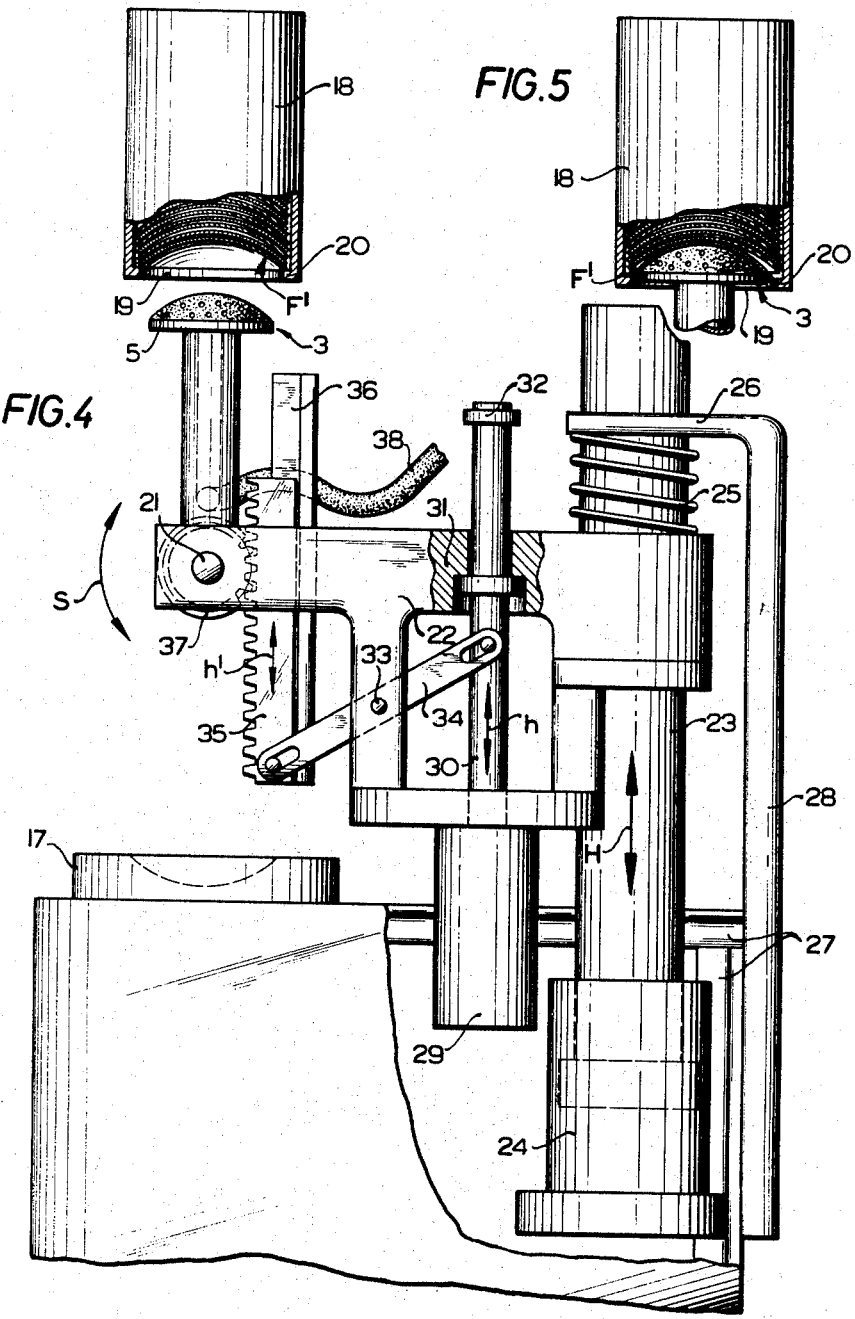

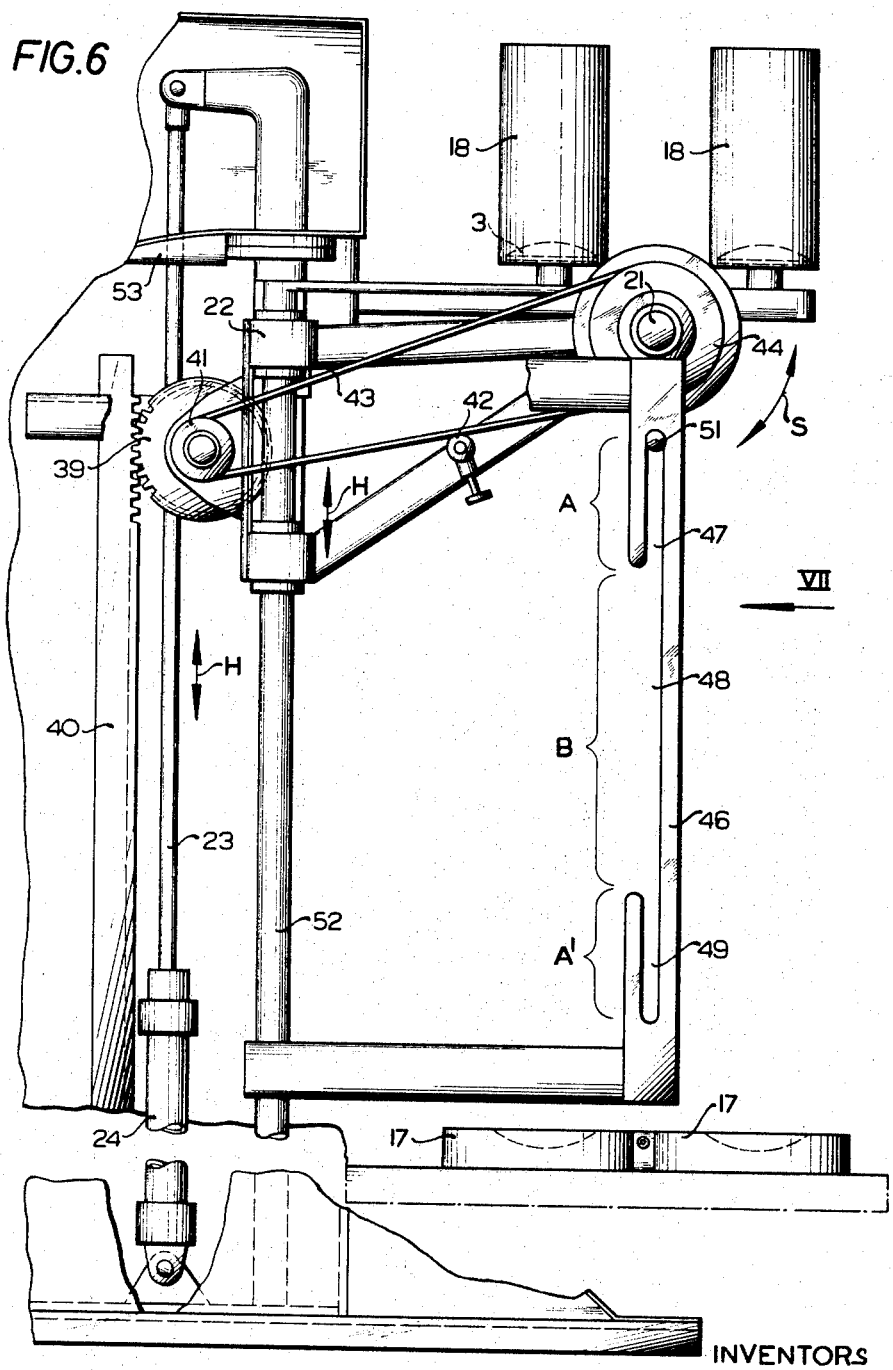

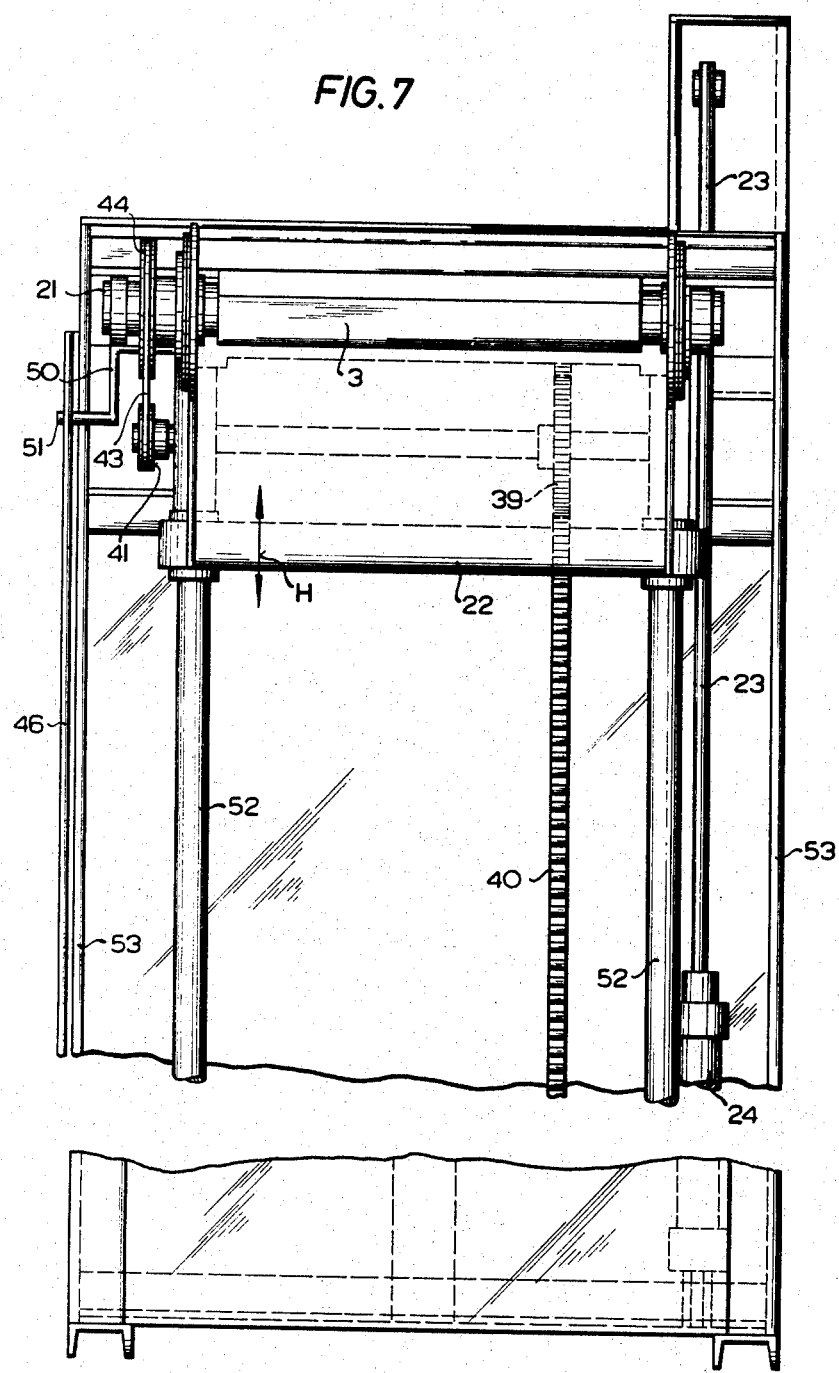

United States Patent Office 3,415,388
Patented Dec. 10, 1968

3,415,388
DEVICE FOR TRANSFERRING PREFORMED FOILS FROM STACKS INTO MOULDS
Roland Hörnlein, Schwabisch Gmund, and Gerold Domhan, Waldstetten, Kreis Schwabisch Gmund, Germany, assignors to Walter Hörnlein Metallwarenfabrik KG, Gmund, Germany
Filed Oct. 19, 1965, Ser. No. 497,959
Claims priority, application Germany, Feb. 6, 1965, H 55,086
12 Claims. (Cl. 214—8.5)

ABSTRACT OF THE DISCLOSURE

A device for the removal of pre-shaped foils from a foil stack and insertion into production moulds, in installations for the production of foil-wrapped chocolate bodies. For obliquely arranged stacks of preshaped foils, the device has a suction head that is obliquely guided by a stationary guide rail against the bias of a spring. The suction head is geometrically similar to the preformed foil bodies and is three-dimensionally reduced with respect thereto at least in the outer edge region by multiple of the foil thickness, for example 1-2 millimeters to produce a gap having a wedge shape in cross section.

---

In such devices the difficulties consist in that the foil stacks are very difficult to separate. The problem upon which the invention is based consists in providing a device for the initially stated purpose with which, with simple construction, a rapid and certain singling out and insertion of the individual preformed foils can be effected, especially in automatically working installations.

In solution of this problem, the invention is characterised by a suction head for each foil stack, which is connected to a suction air conduit, is introduceable into the preformed foil and movable from the foil stack to the production mould, the shape of which suction head corresponds approximately to the shape of the preformed foil, being reduced by a multiple of the foil thickness—for example by 1 to 2 mm. at least in the external region. In the case of ready preformed foils these suction heads correspond to the positive shape of the chocolate body to be produced, but are somewhat smaller than the original form. The conformity of shape can here be quite exact or even only approximate. Now when this somewhat smaller suction head dips into the foil to be taken next from the foil stack, there is a gap of for example about 1 to 2 mm. around it between the head and the foil. When now the air suction is switched on, the elastic foil places itself in its external edge region against the smaller suction body and therefore disengages itself from that lying behind it, so that it can then easily be removed from the foil stack and laid it into the production mould or frame lying ready. The insertion into the mould or frame is more expediently effected by shutting off the air suction and by subsequent brief opposite compressed air impulse. It should also be mentioned that the suction heads more expediently are exchangeably mounted on a common retaining arrangement in the same division and number as the production moulds arranged in each case in a frame.

A further difficulty in the singling out of such stacked, preformed foils consists in that in accordance with a desired asymmetric form of the chocolate body to be produced, they also are preformed asymmetrically and consequently the foil stack does not build up vertically but more or less obliquely. In order to overcome these difficulties, in further development of the invention in the case of an oblique foil stack corresponding to an asymmetric form of the preformed foils, a correspondingly oblique guide is arranged along this stack for the suction head or a holder carrying it, upon which guide the suction head places itself resiliently from an introduction zone lying in extension of the foil stack onwards. The suction head or the retaining arrangement will thus be guided by the guide adapted in each case to the slope of the stack, in dipping into the stack and also on the return path. From the introduction zone onwards then the movement to the production mould takes place. The introduction zone always lies at the same point whence then the guide extends.

In a preferred form of embodiment of the invention to two oblique foil stacks in mirror-image to one another with corresponding guides there is allocated a suction head pair mounted on a common transverse guide, the suction heads of which are in each case independently movable along the transverse guide and are sprung in mutually opposite directions. The oblique guides then more expediently consist of guide straight-edges against which the suction heads or a common holder for a plurality of suction heads lying side by side are pressed through rollers. For example three suction heads can be mounted lying side by side on one common holder, a guide being allocated to the holder at each end. Two such holders can then in turn lie side by side and be carried by one common frame, in the case of oblique foil stacks lying in mirror-image to one another. Thus at such a foil insertion station of the production plant then six preformed foils are inserted at the same time into the production moulds, which are arranged for example in one common frame. In installations for the production of hollow chocolate bodies these are the so-called spinning frames.

In the case of foil stacks where in each case the uppermost preformed foil is withdrawn, it is very irksome that the stack cannot be replenished during operation. One must wait until the entire stack is exhausted, whereupon the device or the entire plant must be halted and fresh foil stacks must be provided. In essential further development of the invention therefore one works with a downwardly open magazine from which in each case the lowermost preformed foil is withdrawn. For this purpose the foil stack is arranged in a magazine provided with a lower engagement opening for the suction head, in which the preformed foils lie one above the other with their inner sides downwards and the lowermost in each case rests on a narrow support edge surrounding the lower engagement opening, the suction head being smaller than the engagement opening by so much that the lowermost foil in each case, when in the condition sucked against the suction head, is movable with its outer edge past the support edge through the engagement opening. During the introduction of the suction head the latter can lift the lowermost preformed foil somewhat together with those lying next above it, so that its outer edge comes free from the support edge and then is sucked against the suction mould of reduced shape. In the sucked condition then the foil can easily be moved out of the magazine. The foil lying there behind, which is not sucked at the same time, then comes as next to lie with its outer edge on the support edge. Such a magazine can be constantly replenished from above during operation.

In a preferred style of embodiment, for the advantageous realisation of the above-mentioned further development of the invention, the suction head is mounted pivotably through 180° in a retaining arrangement about a horizontal axis, the retaining arrangement together with a drive arrangement serving for the pivoting of the suction head being movable upwards and downwards in the vertical direction so far that the upwardly pivoted suction head is introduceable through the lower engagement opening into the magazine, withdrawable therefrom together with the sucked foil and, after pivoting downwards, is lowerable into the production mould. Naturally with this further development of the invention again it is possible for a plurality of suction heads to lie one behind or one beside the other, as described above in principle.

The drive arrangement for the pivoting of the suction head or heads can be constructed in various manners. It is possible for this purpose to utilise a separate cylinder-piston drive arrangement, which is carried by the retaining arrangement. However in further development of the invention an especially simple construction style is achieved due to the fact that the pivotable suction head or heads is or are in drive connection with a toothed wheel movable upwards and downwards with the retaining arrangement and engaging in a fixedly arranged rack, a slipping clutch being included in the drive connection, and with the head or heads there is associated a stationary guide rail having a guide for an engagement peg arranged eccentrically of the pivot axis and connected with the suction head or heads, this guide possessing an upper and a lower section, in which the engagement peg is prevented from rotation about the pivoting axis, and a central section in which the engagement peg can come free from the guide and the suction head can be pivoted.

In this manner a separate drive arrangement for the pivoting of the suction head or heads is avoided, since in the upward and downward movement of the retaining arrangement the toothed wheel is necessarily rotated, which in turn seeks to rotate the suction head. However this is possible only in that section of the guide of the stationary guide rail in which the engagement peg arranged eccentrically of the pivot axis of the suction head can come free from the guide. In the upper and lower sections the head or heads is or are prevented by the guide from rotation, which is possibel due to the slipping clutch.

The part of the suction head comprising the suction openings more expediently consists of a hard elastic synthetic plastics material in which the suction openings are drilled. This hard elasticity should be such that the suction head is not itself deformed in the introduction and application to the preformed foil to be withdrawn, but always leaves the desired clearance gap. This gap in general extends from the middle of the preformed foil and of the suction head outwards in widening fashion. For the realisation of the invention it will also suffice under some circumstances if such a gap is present merely in the external marginal region of adequate width, if the aim is achieved of detaching especially the external marginal region of the preformed foil from that lying behind, after the air suction is applied.

Further details and advantages of the invention will appear from the following description of various forms of embodiment which are represented diagrammatically in the accompanying drawings, wherein:

FIGURE 1 shows a first form of embodiment in lateral elevation,

FIGURE 2 shows the same form of embodiment in front elevation,

FIGURE 3 shows a diagrammatic view of a modified suction head with foil stack,

FIGURE 4 shows a second form of embodiment in lateral elevation, partially in section, FIGURE 5 shows a detail of FIGURE 4 with the suction head, in a position engaging in the magazine, FIGURE 6 shows a third form of embodiment in lateral elevation, FIGURE 7 shows the front elevation of the example according to FIGURE 6, in the direction of the arrow VII.

In the drawings, in FIGURES 1 and 2 the foil stacks are designated by 1. The individual foils possess an asymmetric preformed shape, so that an oblique stack is produced. In the manner which may be seen from the drawing, six stacks are arranged one beside and one behind the other on a base plate 2. Accordingly the device has six suction heads designated in each case as a whole by 3, the actual head part 4 of which consists of hard elastic synthetic plastics material and possesses suction openings 5. The shape of the suction head or more exactly stated the suction head part 4 corresponds to the positive shape of the chocolate body to be produced or the shape of the ready preformed foil. It is however 1 to 2 mm. smaller, so that on dipping into the uppermost foil F a clearance gap occurs, which amounts to about 1 to 2 mm. in the external marginal region. These conditions are illustrated diagrammatically in FIGURE 3. The spacing gap is there designated by 6, in FIGURE 3 there is here shown the condition in which the suction head is dipped into the preformed uppermost foil F, but the air suction is not yet switched on. Thus the uppermost foil has not yet been sucked to the head. In FIGURES 1 and 2 on the other hand there is shown the condition after the switching on of the air suction. There the uppermost foil is already sucked to the head. As may be seen from FIGURE 3, the outer edges of the foil lift themselves away from the foil beneath on sucking, so that the uppermost foil F can be detached easily from the stack.

In the manner which may be seen from FIGURE 2 in each case three adjacent suction heads 3 are mounted on a common holder 7. Two such holders lie side by side, as shown by FIGURE 1, and are in each case displaceably mounted on common transverse guides 8 and sprung by means of springs 9. The springs 9 bear on a middle piece 10 of the transverse guide in each case. The transverse guides 8 are held by stirrups 11 which in turn are movable upwards and downwards by an arrangement (not shown). The suction heads are connected through hoses 12 to a common distributor head 13 for the air suction and pressure. Thence a main connection piece 14 leads to the vacuum plant or air suction fan (not shown), the necessary control arrangements also being interposed.

In accordance with the slope of the foil stack 1, oblique guide straight edges 15 are arranged in the manner which may be seen from the drawing, against which there bear the holders 7 carrying the suction heads, through rollers 16, due to the pressure of the springs 9. The stirrups 11 with the holders 7 and the suction head 3 are always brought to the stack from above, the rollers 16 here come to abut in the upper region of the guide straight edges 15, so that on further lowering of the stirrups 11 the holders with the suction heads 3 necessarily are conducted inwards into the correct position above the uppermost foil. The return travel takes place in the same manner, so that foil stacks of any desired slope can easily be singled out by an appropriate setting of the guide straight edges. For this purpose the straight edges 15 can be made adjustable.

In the case of the embodiment according to FIGURES 4 and 5 the foil stack 1 is housed in a magazine 18 arranged vertically above the production mould 17. This magazine possesses an upper filling opening (not shown) and a lower engagement opening 19 for the suction head again designated by 3. Around the engagement opening 19 there is formed a narrow support edge 20, on which the lowermost foil F' in each case rests with its outer edge. The suction head 3 is introduceable through the engagement opening 19 into the magazine until it abuts on the inner side of the lowermost foil F'. Before the air suction is switched on it then assumes approximately the same position in relation to the foil F' as was illustrated in converse manner in FIGURE 3, as a result of its reduced form in comparison with the foil. The foil F' and the foils lying next thereabove are lifted somewhat by the suction head, so that the outer edge of the foil F' comes free from the support edge 20, whereupon the air suction is switched on and the lowermost foil F' places itself with its outer edge against the suction head, as is illustrated in FIGURE 5. Due to the greater curvture of the foil its base area reduces, so that it can be moved with the suction head out through the engagement opening 19. The foil following there behind then places itself with its outer edge on the support edge 20. In the lifting of the lowermost foil F' in general the entire foil stack is not also lifted, but only a slight compression of the foils next there above takes place.

The suction head 3 is pivotable through 180° in the direction of the arrow S about a horizontal spindle 21, which is arranged on the vertical line of connection between the magazine 18 and the production mould 17. At the same time the spindle 21 is movable upwards and downwards in a frame 22 in which it is mounted. This frame 22 is connected with a piston rod 23 which is movable upwards in the direction of the arrow H by a cylinder-piston drive system 24 and downwards by a return spring 25.

The return spring 25 bears on an arm 26 of a stirrup 28 secured on the machine frame 27, which stirrup serves at the same time for the guidance of the upper end of the piston rod 23.

On the upwardly and downwardly movable frame 22 there is secured a second cylinder-piston system 29, the piston rod 30 of which is upwardly and downwardly movable in the direction of the arrow h and is guided in the frame 22 at 31. It also possesses stops 32. The movement of the piston rod 30 is transmitted through a lever 34 pivotably mounted on the frame 22 about the spindle 33, to a rack 35 which is slidable along a guide rail 36 secured on the frame 22 and is moved upwards and downwards in relation to the frame 22 in the direction of the arrow h' in accordance with the movement of the piston rod 30. On the pivot spindle 21 of the suction head 3 there is mounted a toothed wheel 37 firmly connected with the suction head, which wheel engages with the rack 35. On operation of the cylinder piston drive system 29 thus this toothed wheel 37 and with it the suction head 3 are rotated, so that the latter can be pivoted downwards through 180° out of the position as shown in FIGURE 4 to above the production mould 17. 38 designates the vacuum connection hose connected with the pivot arm of the suction head (3) and leading to the suction or compressed air source (not shown).

In operation the frame 22 with the suction head 3 is moved upwards out of the position shown in FIGURE 4, by operation of the cylinder-piston drive system 24, into abutment with the foil F', whereupon the air suction is switched on and the foil is sucked in the described manner. Thereupon the lowering of the frame 22 with the suction head 3 takes place into the position shown in FIGURE 4, whereupon the cylinder-piston drive system 29 is operated and the pivoting of the suction head 3 about the spindle 21 is effected. The frame 22 with the suction head 3 is then lowered by a further operation of the cylinder-piston drive system 24. The air suction is then shut off and a brief impulse of compressed air takes place, by which the foil is disengaged from the suction head 3. Lifting into the position as shown in FIGURE 4 and pivoting upward of the suction head 3 again then take place. Naturally it is possible again to arrange a plurality of suction heads on one common holder and to pivot them commonly, and it is also possible for a plurality of holders lying side by side to be moved up and down commonly by the frame 22. Thus two cylinder-piston drive systems can readily be made to suffice for six simultaneously movable suction heads.

The embodiment according to FIGURES 6 and 7 is constructed similarly to that according to FIGURES 4 and 5, but without a separate drive device for the pivoting of the suction head or heads. The parts conforming in principle with the embodiment according to FIGURES 4 and 5 are therefore provided with the same references in FIGURES 6 and 7. However, two magazines 18 are provided with suction heads 3 co-operating therewith, namely offset at equal intervals laterally of the spindle 21, over the hinged-up production mould 17. The suction heads 3 are again pivotable in the direction of the arrow S through 180° about the horizontal spindle 21, this spindle 21 being mounted in an upwardly and downwardly movable frame 22. The frame 22 is connected with a piston rod 23 which is movable upwards and downwards in the direction of the arrow H by a cylinder-piston drive system 24. Thus so far the assembly is, in principle, the same as that of the embodiment according to FIGURES 4 and 5.

For the pivoting of the suction heads 3, which are more expediently arranged on a plate piece, there now serves a toothed wheel 39 mounted in the frame 22 and constantly engaging with a fixedly arranged rack 40, so that at every upward and downward movement of the frame 22 it is rotated accordingly. With the toothed wheel 39 there is connected a belt pulley 41 which, through a drive belt 43 tensionable by means of a tensioning device 42, drives a belt pulley 44 mounted on the pivot spindle 21 and connected with the plate piece of the suction heads 3 through a slipping clutch. In order to control the rotation of the latter, a guide rail 46 is stationarily arranged. This is provided with guide sections 47, 48, 49 lying one above the other, of which the upper section 47 and the lower section 49 are formed as slots in which there engages an engagement peg 51 arranged eccentrically of the pivot spindle 21 and connected with the plate piece of the suction heads 3 through a stirrup 50. In the middle section 48 of the guide rail 46 the guide slot is open on one side, so that the engagement peg 51 can lift itself away from the guide rail 46 in the direction corresponding to the direction of rotation of the gearwheel 39, and after rotation of the suction head 3 through 180° strikes again upon the guide rail, in order to prevent further rotation. In the further downward movement of the frame 22 the engagement peg dips into the slot of the lower guide section 49. Thus rotation of the suction heads 3 is prevented in the sections A and A' entered in FIGURE 6, while in the middle section B lying therebetween it is possible, and is effected by rotation of the toothed wheel 39. The slipping clutch slips in the sections A and A'.

In FIGURE 7 the magazines 18 and the head parts of the suction heads 3 are not shown. For the guidance of the frame 22 there serve columns 52 which are secured, like the rack 40 in the guide rail 46, to an external machine frame 53. The style of withdrawal of the foils from the magazines 18 and of the insertion into the hinged-open production mould 17 is the same as in the embodiment according to FIGURES 4 and 5. As there, here again the possibility exists of moving a plurality of suction heads 3 by common drive arrangements. The number of the magazines and suction heads is determined according to the size of the production mould and according to the number of the individual moulds contained therein. In the example according to FIGURE 6, magazines and suction heads are always provided in pairs and lie perpendicularly above the individual moulds of the hinged-open production mould.

The foils ordinarily used for the wrapping of the chocolate bodies consist of aluminum and are only about 3/100 mm. in thickness. The invention has proved advantageous especially for such extremely thin foils.

We claim:
1. For an installation having moulds for the production of foil-wrapped chocolate bodies, a device for the withdrawal of preformed three-dimensionally cup-shaped thin foil bodies from foil body stacks and the insertion of said foil bodies into said moulds, comprising means for supporting at least one of said foil body stacks of said preformed foil bodies, a suction head for said one foil body, an air suction conduit connected to said suction head, and means for moving said suction head from said foil body stack to the respective one of said moulds, said suction head having a shape which corresponds, three-dimensionally reduced by a multiple of the foil thickness at least in the external marginal region, approximately to the shape of said preformed foil bodies, and constituting means with said conduit introduceable into the space embraced by each of said preformed foil bodies to form a wedge shaped gap reducing in cross section toward the central portion of the engaged foil body and for reducing the external marginal dimensions of the engaged foil body by sucking the engaged foil body tightly against said suction head, said suction head having a surface for engaging the respective one of said foil bodies, a plurality of apertures scattered all over said surface of said suction head radially from its central portion to provide all along said wedge-shaped gap a plurality of small suction openings from closely adjacent said central portion radially outwardly at close intervals to the marginal edge of said surface to constitute means for sucking the foil body from its central portion progressively and substantially uniformly radially outward to its marginal edge.

2. A device as claimed in claim 1, in which the shape of said suction head is reduced at least in the external marginal region by at least 2 mm. in comparison with the shape of said preformed foil bodies.

3. The device according to claim 1, including at least one magazine for said preformed foil bodies, said preformed foil bodies each embracing a space and having an outer side, an outer edge and an inner side facing said space, said magazine having a lower foil body extraction opening, said preformed foil bodies lying one above the other with their inner sides downward above said foil body extraction opening of said magazine and constituting said foil body stack, said magazine having stationary projections at said foil body extraction opening, the lowermost of said foil bodies resting with said outer edge on said projections, said suction head being mounted for movement upwardly until the lower most preformed foil body is lifted from said projections, and said suction head is three-dimensionally reduced with respect to the preformed foil body so that the outer diameter of the tightly engaged pre-formed foiled body is essentially smaller than the inside diameter of said engagement openings and projections.

4. A device as claimed in claim 3, said projections being united to constitute a rigid support edge surrounding said foil body extraction opening of magazine.

5. A device as claimed in claim 3, comprising a frame, bearing means for said suction head for pivoting through approximately 180° about an approximately horizontal axis, driving means connected with said bearing means for the pivoting of said suction head, said bearing means being movable upwards and downwards in said frame to such an extent that said suction head in pivoted-up condition is introduceable into said magazine through said lower foil body extractiton opening by an upward movement of said bearing means and, after extracting said suction head out of said magazine and after pivoting downwards, is lowerable into the respective one of said moulds.

6. A device as claimed in claim 5, for placing foil bodies in production moulds each comprising two halves hinged to one another and lying side by side in hinged-open condition ready for the insertion of said foil bodies, comprising at least two foil body magazines each being arranged vertically above the respective one of said halves of said production mould, one of said suction heads for each of said two magazines, a common support for mounting said suction heads, said support being pivotable about said approximately horizontal axis, said axis lying between said two magazines and said hinged-open halves of said mould.

7. A device as claimed in claim 5, comprising a rack on said frame and a gearwheel mounted on said bearing means so that said gearwheel engages said rack during the upward and downward movement of said bearing means, said pivotable suction head being in rotational drive connection with said gearwheel, a slipping clutch interposed in said drive connection, a stationary guide rail mounted on said frame, and a stop element connected with said suction head eccentrically of said axis and engaging said guide rail, said guide rail comprising an upper portion and a lower portion in both of which said stop element is prevented from rotation about said axis, and a middle portion in which said stop element is freed from said guide rail and said suction head can be pivoted.

8. A device as claimed in claim 7, said guide rail having longitudinal slots constituting said upper portion and said lower portion, and said stop element being slidable in said slots.

9. The device of claim 1, said suction head having a foil body engaging part having suction openings, said part consisting of a hard elastic synthetic plastic, an air suction conduit connected to said suction head, means for moving said suction head from said foil stack to the respective one of said moulds, said part of said suction head having a shape which corresponds, reduced by a multiple of the foil thickness at least in the external marginal region, approximately to the shape of said preformed foils, and being introduceable into the space embraced by each of said preformed foils.

10. For an installation having moulds for the production of foil-wrapped chocolate bodies, a device for the withdrawal of asymmetric preformed foil bodies from foil body stacks which are oblique in correspondence with the asymmetric form of said preformed foil bodies, and for the insertion of said foil bodies into said moulds, comprising means for supporting at least one of said oblique foil body stacks of said asymmetric preformed foil bodies, a suction head for each of said foil body stacks, an air suction conduit connected to each said suction head, means for moving said suction head from said foil body stack to the respective one of said moulds, said suction head having a shape which corresponds, reduced by a multiple of the foil thickness at least in the external marginal region, approximately to the shape of said preformed foil bodies, and being introduceable into the space embraced by each of said preformed foil bodies, an oblique guide for said suction head arranged along said oblique foil body stack and being correspondingly oblique, means for engaging said suction head with guide in extension of said foil body stack, said suction head being placed along said guide onwards, and resilient means for forcing said suction head against said oblique guide.

11. A device as claimed in claim 10, wherein said oblique guide constitutes a bar.

12. For an installation having moulds for the production of foil-wrapped chocolate bodies, a device for the withdrawal of asymmetric pre-formed foil bodies from foil body stacks which are oblique in correspondence with the asymmetric form of said preformed foil bodies, and for the insertion of said foil bodies into said moulds, comprising means for supporting at least two of said oblique foil body stacks of said asymmetric preformed foil bodies obliquely in mirror-image to one another, a suction head for each of said foil body stacks, an air suction conduit connected to each of said suction heads, means for moving said suction heads from the respective one of said foil body stacks to the respective one of said moulds, said suction heads having a shape which corresponds, reduced by a multiple of the foil thickness at least in the external marginal region, approximately to the shape of said pre-formed foil bodies, and being introduceable into the space embraced by each of said pre-formed foil bodies, an oblique guide bar for each of said suction heads arranged along the respective one of said oblique foil body stacks and being correspondingly oblique, a common movable transverse bar between said guide bars, said suction heads being mounted on and being independently displaceable along said transverse bar, and resilient means for forcing each of said suction heads independently against the respective one of said guide bars.

(References on following page)

References Cited

UNITED STATES PATENTS

| | | |
|---|---|---|
| 1,072,553 | 9/1913 | Winder. |
| 2,716,765 | 9/1955 | Quinn et al. _____ 214—8.5 X |
| 2,074,815 | 3/1937 | Tevander et al. |
| 2,937,786 | 5/1960 | Muller _____ 221—211 |

FOREIGN PATENTS 234,385  11/1959  Australia.

GERALD M. FORLENZA, *Primary Examiner.*

F. E. WERNER, *Assistant Examiner.*

U.S. Cl. X.R.

214—1; 294—64